United States Patent Office 2,700,516
Patented Jan. 25, 1955

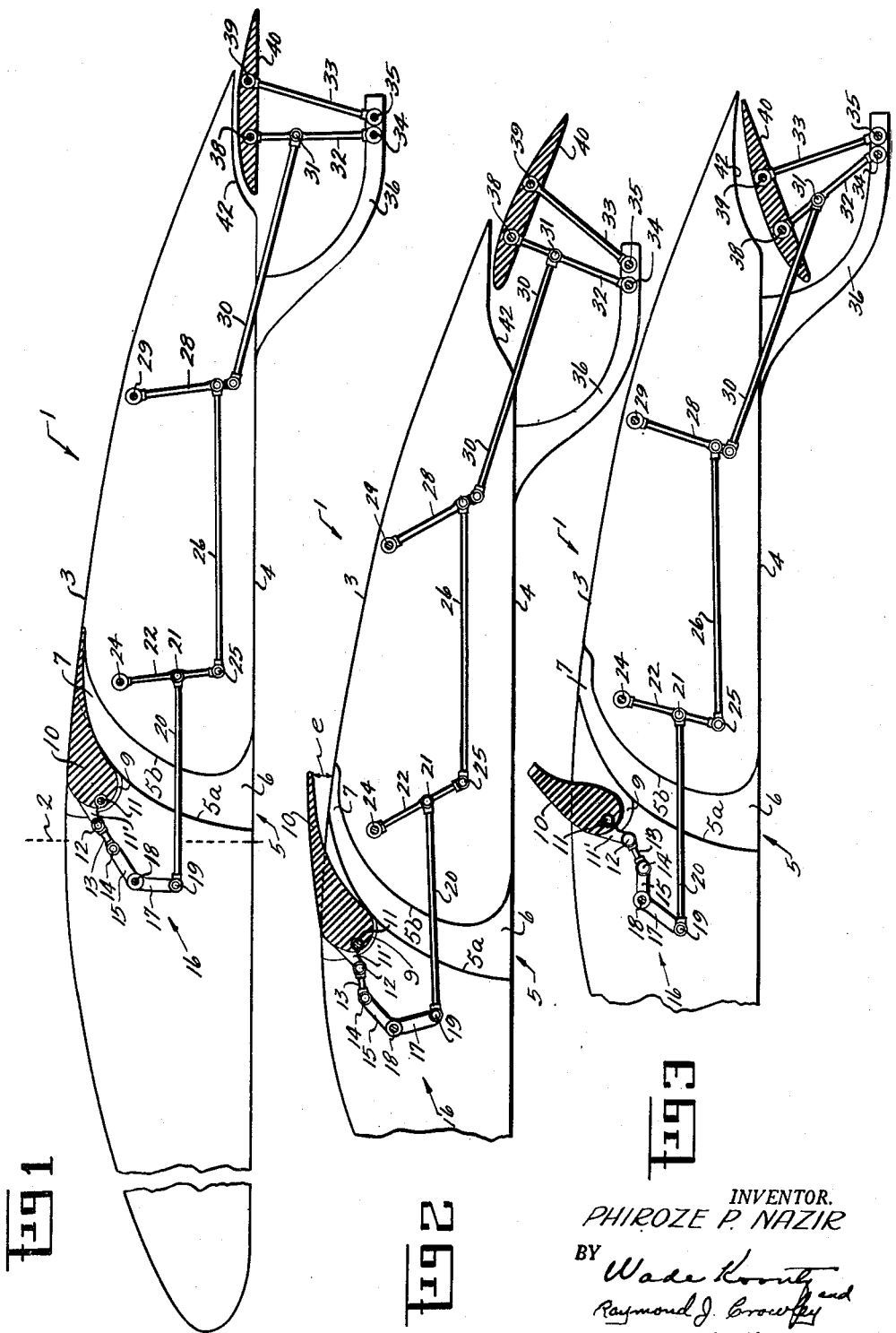

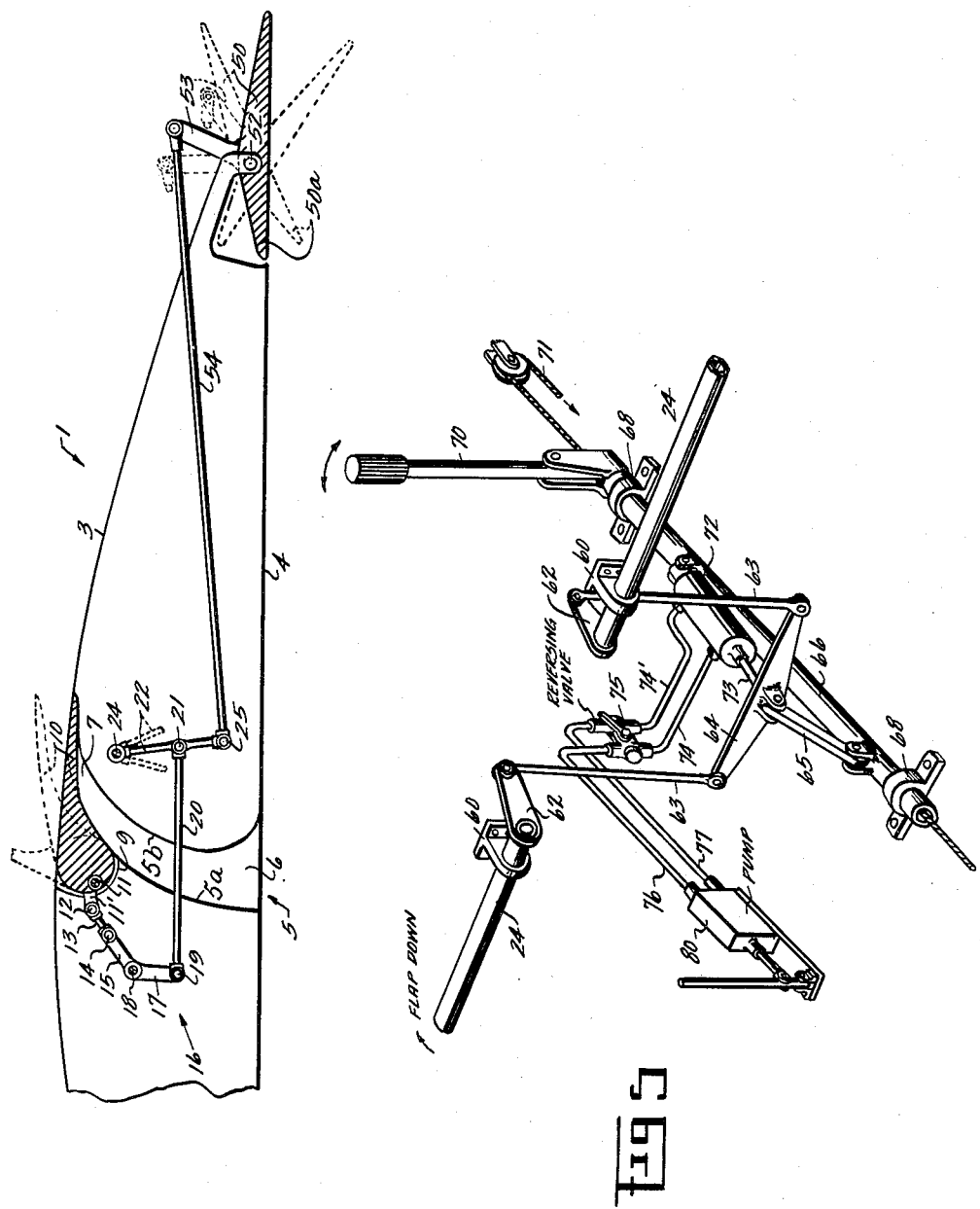

2,700,516

AIRCRAFT LIFT CONTROL DEVICE

Phiroze P. Nazir, Hollywood, Calif.

Application January 31, 1950, Serial No. 141,378

8 Claims. (Cl. 244—42)

The invention described herein may be manufactured and used by or for the United States Government for governmental purposes without payment to me of any royalty thereon.

The present invention relates to a lift control device for aircraft in which very high lift may be produced in conjunction with means for securing adequate lateral control at or beyond the normal stalling point of the wing.

Various slotted wing arrangements have been developed in the past which are capable of developing high lift coefficients but when attempting to employ such devices in a dual function as ailerons adverse yawing moments and premature stall have made it impossible to utilize the high lift otherwise obtainable. Spoiler ailerons are known to have favorable characteristics for roll control at low speed but have been placed when used in conjunction with a slot forward of the mid point of the chord of the airfoil section of the wing and so far as the inventor is aware have not been incorporated in a high lift producing device so as to enable the same to effectively be employed directly to increase the lift on the wing and differentially to effect roll control.

In accordance with the present invention the aircraft wing of conventional airfoil cross section is provided with a fixed slot having an inlet on the under-surface of the wing and extending upward and rearward to a discharge outlet on the upper surface of the wing positioned aft of fifty percent of the wing chord. The slot extends spanwise over a portion of each semi-span of the wing and when open directs a stream of high velocity air over the rear portion of the airfoil tending to prevent boundary layer separation even at very high angles of attack and in itself increasing the maximum lift coefficient. The discharge opening of the slot is normally closed by means of a plate or lip pivotally supported on the wing and overlying the slot discharge opening. The lip is adapted when in its normal position to smoothly fair into the upper contour of the airfoil section and when elevated in varying amounts up to ten or fifteen degrees serves to control the area of the discharge opening of the slot and hence controls the lift and boundary layer conditions on the airfoil. When serving to control air flow through the slot the slot lip produces no adverse effect on air flow over the upper surface of the wing but when further elevated it serves as a spoiler to disrupt air flow over the wing for a spanwise extent considerably greater than the length of the lip. In addition to the slot the wing is provided with a supplemental lift increasing mechanism such as an auxiliary airfoil nested on the underside of the wing or a narrow chord flap with the slot lip interconnected with the flap actuating gear such that when the auxiliary airfoil or the flap are actuated to increase the lift the slot control lift is proportionally elevated to open the slot discharge opening. When the flap or auxiliary airfoil is moved in the sense to decrease airfoil lift the slot lift is moved a much greater extent to serve as a spoiler.

A further feature is the provision that the supplemental lift increasing mechanism is so constructed as to produce drag creating a favorable yawing moment to supplement the spoiler. In order to conserve weight and to reap the maximum benefits of the invention it is desirable to actuate the controls for the lift control devices in unison for increase of wing lift and differentially to serve as ailerons or roll control devices.

A further feature of the invention is the provision in one form of the supplemental lift varying device of an auxiliary airfoil normally nested on the underside of the wing adjacent the trailing edge and movable down and rearward to increase the airfoil mean camber and wing area and further movable forward and down to produce a drag creating a yawning moment favorable to turning.

In view of the foregoing description it is the principal object of the invention to provide an airfoil having a fixed slot therein with its outlet positioned aft of fifty percent of the chord, the slot having a movable lip adjacent its outlet at the upper surface of the airfoil, the lip being adjustable to vary the slot discharge area and when elevated beyond a predetermined point to disrupt the air flow over the airfoil upper surface to serve as a spoiler.

It is a further object of the invention to provide in combination with the slot and control mechanism therefor of the character described a supplemental lift control device operable when actuated in one sense to increase the lift of the airfoil in conjunction with movement of the slot lip to open the slot discharge opening and when actuated to reduce lift to move the lip to spoiler position.

It is another object of the invention to provide lift control apparatus for aircraft wings in which an auxiliary airfoil is mounted at the undersurface of the wing and movable in one sense to increase wing camber and area and movable in another sense to decrease wing lift and produce a yawing moment favorable to turn.

With the foregoing objects in view other objects and specific details of the invention will become apparent to those skilled in the art by reference to the detailed description and to the appended drawings in which:

Fig. 1 is a side elevation illustrating a cross section of a wing incorporating a high lift device in accordance with the invention;

Fig. 2 is a partial view of the device of Fig. 1 but illustrating the positions of the auxiliary airfoil and slot lip in the position for obtaining maximum lift;

Fig. 3 is a partial view of the device of Fig. 1 illustrating the positions of the auxiliary airfoil and slot lip when employed to function as a roll control device or aileron;

Fig. 4 is a view similar to Fig. 1 illustrating a modified form of the invention; and Fig. 5 is a schematic view of a suitable control system for actuation of high lift devices in accordance with the invention.

Referring to Fig. 1 the reference numeral 1 generally indicates the boundary outline of a conventional aircraft wing of airfoil shape in cross section having its midchord indicated by the dotted line 2. The reference numerals 3 and 4, respectively, indicate the upper and lower cambered surfaces of the airfoil cross section of the wing. A slot generally indicated by the reference numeral 5 formed by impervious spaced front and rear wall members respectively indicated by reference characters 5a and 5b extends upward and rearward through the wing with its inlet opening 6 on the undersurface 4 of the airfoil and its discharge opening 7 extending through the upper surface 3 of the airfoil. The discharge opening 7 of the slot 5 should be positioned so that its front edge is positioned aft of fifty percent of the wing chord preferably from 55 to not more than 70 percent of the wing chord aft of the leading edge so that high velocity air flow through the slot may control boundary layer separation over the aft portion of the airfoil so as to overcome the adverse pressure gradient and extend the stalling point and increase the lift otherwise attainable at high angles of attack.

The wing structure is provided with an arcuate recess 9 adjacent the terminal portion of the front wall 5a of the slot 5 which serves to receive the front portion of a slot lip or plate 10 suitably pivotally supported as at 11 for rotation. The slot lip is positioned so as to normally overlie the terminal portions of the slot so as to prevent the flow of air therethrough and its upper side is designed to smoothly fair into the airfoil contour and the underside of the lip is curved to form a smooth continuation of the front wall 5a of the slot 5. As the slot lip is elevated about its pivotal axis 11 the width $e$ of the discharge opening 7 (see Fig. 2) is increased permitting an increased air flow through the slot 5. The increased slot opening increases the circulation around the aft portion of the airfoil permitting a much higher lift coefficient to be attained at high angles of attack and preventing boundary layer breakaway and burbling up to and in excess of angles of attack of thirty degrees. Slot lip movements of from ten to fifteen degrees, dependent upon the particular airfoil employed, have no appreciable disturbing effect on airflow over the upper surface of the airfoil.

The slot 5 formed by the spaced front and rear wall members 5a and 5b and the slot lip 10 extend spanwise of the wing for an extent of from thirty percent of the semispan to substantially the full semispan of each wing panel on opposite sides of the plane of symmetry dependent in each individual case on the magnitude of the maximum lift and rolling moments desired.

The lip 10 is provided with one or more control arms or horns 11' rigidly attached to the slot lip and adapted to cause pivotal movement of the lip about the pivotal axis 11 pivotally connected at 12 to a swinging link 13 which is pivoted at 14 to one arm 15 of a bell crank 16 rotatably supported at 18 within the wing structure. The bell crank 16 has an arm 17 pivotally connected as at 19 to a control rod 20 which is pivotally connected at 21 intermediate the ends of a control arm 22 secured at its inner end to a main control or rock shaft 24.

Rotation of the rockshaft 24 in either direction from the neutral position as shown in Figure 1, will produce a corresponding rotation of the bell crank 16 but due to the swinging link 13 causes rotation of the lip 10 always in a counterclockwise direction about its axis of rotation 11, note the relative position of the parts in Figs. 2 and 3. By the proper design of the control linkage the displacement of the slot lip for a given displacement of the control shaft 24 in a clockwise sense is three or more times the corresponding deflection for a counterclockwise rotation of the shaft 24.

The control arm 22 is pivotally connected at its outer end 25 to a rod 26 pivotally connected to an arm 28 pivotally supported at 29 within the wing structure and pivotally connected at its outer end to a horizontal link 30. The link 30 is connected at 31 to the first of a pair of pivot support arms 32 and 33 pivotally mounted at 34 and 35, respectively, on a suitable supporting structure 36 secured to the aircraft wing structure. The arms 32 and 33 are pivotally connected at their upper ends as at 38 and 39, respectively, to an auxiliary airfoil 40 serving a function similar to a flap and normally housed in a recess 42 formed on the underside of the wing structure.

When the main control shaft 24 is rocked in a counterclockwise direction control forces in rods 26 and 30 cause the trailing edge of the auxiliary airfoil 40 to be moved down and to the rear from the position shown in Fig. 1 to the position shown in Fig. 2, the action of the pivoted supporting arms 32 and 33 causing the auxiliary airfoil to increase its angle of attack and to vary the mean camber line curve of the main airfoil as well as increasing the wing area. Movement of the auxiliary airfoil 40 from the position of Fig. 1 to that of Fig. 2 causes a large increase in lift coefficient of the wing 1 as the angle of attack of the latter is increased and contributes to the extension of the stalling point from a normal value of sixteen degrees to better than thirty degrees angle of attack.

Rotation of the main control shaft 24 in the counterclockwise sense to affect the above described movement of auxiliary airfoil 40 simultaneously through arm 22, control rod 20, bell crank 16, link 13 and control horn 11' causes the slot lip 10 to be elevated so that the same assumes the position shown in Fig. 2 for maximum lift increasing deflection of auxiliary airfoil or flap 40, thus opening the slot to have a maximum discharge opening. The movement of the trailing edge of the auxiliary airfoil down and to the rear causes an increase in the pressure on the undersurface of the airfoil and thus promotes an increase of flow through the slot further enhancing the lift and preventing a stall or burbling of the airflow over the aft portion of the wing even at very high angles of attack. By proper design of the control linkage the movement of the slot lip may be controlled in a predetermined relation with the movement of the auxiliary airfoil 40. The cooperation between the slot and auxiliary airfoil in increasing the lift and delaying wing stall permits the auxiliary airfoil chord to be considerably reduced from that ordinarily employed on flaps reducing the weight and aerodynamic forces and further the use of the double pivoted support arms serves to transmit the loads into the wing structure without imposing heavy loads on the control system. With an arrangement in accordance with the invention movement of the lift varying element such as the auxiliary airfoil 40 need not be excessive and wind tunnel tests indicate that a maximum down and angular movement of thirty degrees is satisfactory.

When the main control shaft 24 is rotated in a clockwise sense it causes the auxiliary airfoil to be rotated through rods 26 and 30 and supporting pivot arms 32 and 33 until it moves with its leading edge forward and down to a position such as shown in Fig. 3. The airfoil 40 in moving from the neutral position of Fig. 1 to the position of Fig. 3, creates little or no increase in lift but greatly increases the drag such that when the lift control devices are operated differentially as ailerons the increase in drag produces a yawing moment which is favorable and counteracts or overcomes the adverse yawing moment produced by the lift control device acting on the wing on the opposite side of the plane of symmetry.

Actuation of the control shaft 24 in the clockwise sense again simultaneously moves the slot lip 10 upward until it assumes a position such as shown in Fig. 3 where it attains an angle of forty-five or more degrees from the horizontal as compared to a maximum displacement of fifteen degrees in Fig. 2. In the position shown in Fig. 3 the slot lip 10 serves the function of a conventional spoiler disrupting the air flow over the rear portion of the wing and spoiling the lift over a considerable portion thereof. When used in differential operation, the reduction in lift on one side and the increase in lift on the opposite side of the plane of symmetry gives rise to the necessary rolling moment for aileron action.

The elevation of the slot lip 10 to serve as a spoiler in the manner as shown in Fig. 3 also renders the slot 5 ineffective to increase lift since burbling air flow over the rear portion of the airfoil negatives the effect of the air discharged from the slot in controlling breakaway of the air flow.

In Fig. 4 a modified form of the invention is illustrated in which parts corresponding to those of Fig. 1 are given the same reference numerals. The difference between the two forms of the invention resides in the use of a "Fries" type aileron 50 for the auxiliary airfoil or flap 40, Fig. 1. The aileron or flap 50 is suitably hinged as at 52 on the wing structure the hinges being aft of the leading edge of the aileron. A control horn 53 is connected directly to a control rod 54 which is the equivalent of rod 26 of Fig. 1.

The action of the arrangement of Fig. 4 is identical with that of the device of Fig. 1 so that when the aileron 50 is moved so that its trailing edge goes down it serves as a flap to vary the mean camber of the airfoil and to increase the lift in conjunction with the simultaneous movement of the slot lip 10 to open the slot 5. When the control shaft 24 is moved in the sense to cause aileron 50 to move up a portion thereof 50a forward of the hinge extends below the undersurface 4 of the airfoil creating additional drag and a favorable yawing moment desirable in use of the lift control as an aileron or roll control system. By limiting upward movement of the trailing edge of the aileron 50 to fifteen degrees or less the blanketing effect tending to reduce the efficiency of the spoiler action of slot lip 10 will be minimized.

Because of the cooperation between the auxiliary lift increasing devices, the auxiliary airfoil or flap 40 of Fig. 1 and the "Fries" aileron or flap 50 of Fig. 4, with the slot and control therefor makes it possible to reduce the chord and area of elements 40 and 50 from that ordinarily employed since lift coefficients of 2.64 and higher may be readily attained and stalling delayed beyond 29° angle of attack. The dual function of the slot lip 10 in also serving as a spoiler makes it possible to efficiently use the lift control differentially as an aileron system, thus reducing the structural elements and cost to a minimum. Loads on the spoiler tend to oppose loads on the flap or equivalent element thus reducing control forces required. Further the area of the slot lip 10 acting as a spoiler may be less than in previously suggested spoiler controls or combinations of spoilers with ailerons which materially reduces the lag effect previously encountered with spoiler roll control devices. Lift control devices in accordance with the invention further reduce the effects of lag since the control producing high lift on one side of the plane of symmetry immediately produces rolling moment and the portion of the auxiliary airfoil or flap projecting below the undersurface of the wing produces a positive yawing moment immediately so that any slight lag in spoiler action will be compensated. By the arrangement of the spoiler aft of the fifty per cent of the chord stalling is induced initially over the rear portion of the wing and the decrease in lift is more gradual thus avoiding the violent development of rolling moments previously encountered with spoilers.

In order to effectively employ structure in accordance with the invention as a pure lift control or alternately as an aileron or roll control system it will be understood that one of the devices will be employed on each wing panel on opposite sides of the plane of symmetry and to effect pure lift control the main control shafts 24 from each assembly will simultaneously be rotated in the same sense i. e. counterclockwise while to employ the devices for roll control or as ailerons the control shafts 24 must be rotated with respect to each other in opposite senses of rotation. A suitable mechanism for accomplishing the desired control based on the control system principles disclosed in the United States Patent 1,600,834, granted September 21, 1926, to Otto Mader is disclosed in Fig. 5 no novelty per se being claimed for this control system.

As seen in Fig. 5 the main control shafts 24 extending to the right and left wing panels on opposite sides of the plane of symmetry are suitably supported for rotation about their longitudinal axes by means of a plurality of bearings such as indicated at 60 which are secured to the wing structure. At their inner ends each of the shafts 24 have control arms 62 rigidly secured thereto which are pivotally connected by means of rods 63 to a transverse rocking control arm 64. The control arm 64 is secured by means of a pivoted link 65 to a longitudinally extending hollow shaft 66 suitably supported by bearings 68 for rocking movement due to lateral displacement of the pilot's control stick 70 which may be moved fore and aft to actuate the elevator control cable 71 which passes through the hollow shaft 66 and is connected to the control stick.

A conventional reciprocating double acting hydraulic motor 72 is pivotally mounted on the rockshaft 66 and has its piston rod 73 pivotally connected to the transverse rocking arm 64. The motor 72 is connected by flexible conduits 74 and 74' to a reversing valve 75 connected by conduits 76 and 77 to a conventional manually actuated pump 80.

In operation of the control system of Fig. 5 transverse displacement of control stick 70 in the conventional manner causes rocking of shaft 66 which through link 65 rocks the transverse control arm 64 moving one of the rods 63 vertically upward and causing a corresponding downward vertical movement of the other rod 63, which motions through control arms 62 will effect equal and opposite rotations to the respective control shafts 24 which in the manner previously described will result in generation of rolling moments or aileron action.

By setting the control handle of reversing valve 75 in one of two control positions and actuating pump 80 the piston rod 73 of hydraulic motor 72 will be displaced such as to lower the rocking arm 64 causing control arms 63 to simultaneously move down an equal amount causing main control shafts 24 to be rotated to cause a high lift increase on the wing by lowering of auxiliary airfoil 40 Fig. 1 with movement of the slot lip 10 to open the slot discharge 7. Opposite setting of the reversing valve 75 and actuation of the pump will cause the hydralic motor 72 to elevate the rocking arm 64 to cause shafts 24 to be rotated in a sense to cause a decrease in lift by spoiler action on both wing panels with a simultaneous increase in drag causing the aircraft to descend on a very steep glide path.

It will be noted that differential action is possible from any vertical setting of the rocking arm 64 so that lateral control is always available except that suitable stops would be employed to limit maximum displacement of the lift control devices.

I claim:

1. A control device for aircraft having a wing of airfoil cross-section comprising a slot extending from the lower to the upper surface of the airfoil, said slot having its outlet aft of the midpoint of the chord of the air foil and adapted to discharge air at high velocity over the aft portion of the airfoil, a slot lip pivotally mounted on the wing structure and in a normal position to overlie and close the slot outlet and to smoothly fair into the upper surface of the air foil, auxiliary lift varying means operatively associated with said airfoil and adapted to be moved in opposite senses from a neutral position to respectively increase and decrease the lift of the airfoil, control means for selectively actuating said auxiliary lift varying means, and means positively connecting said slot lip and said control means for movement in either direction whereby actuation of said auxiliary lift varying means from said neutral position in the sense to increase airfoil lift positively operates said slot lip to be elevated to open the slot outlet to render airflow through the slot effective for lift control and positively moving said slot lip upward to serve as a spoiler to disrupt airflow over the upper surface of the air foil when said auxiliary lift varying control means is moved in the opposite sense from said neutral position to decrease the airfoil lift.

2. In an airfoil lift control device a fixed slot extending through from the lower to the upper surface of the airfoil, said slot having an outlet positioned aft of the midpoint of the airfoil chord, a rotatably mounted slot lip normally closing the outlet of the slot and smoothly fairing with the upper surface of the airfoil and the undersurface of said slot lip forming a continuation of the front wall of the slot, a control shaft rotatable in either of two directions from a neutral position and variable ratio linkage positively interconnecting said control shaft and said slot lip for movement in either direction, limited movement of said control shaft in one direction positively elevating said slot lip sufficient to effect slot opening without the lip materially disturbing air flow over the upper surface of the airfoil, limited rotary movement of said control shaft of the same magnitude in the opposite sense from the neutral position causing through said linkage a magnified elevation of said slot lip such that the same serves as a spoiler to disrupt air flow over the upper surface of the airfoil.

3. In combination an airfoil, a lift increasing slot extending rearwardly and upwardly to a discharge opening in the upper surface of the airfoil, a slot lip pivotally mounted on the airfoil such that in a normal position its upper surface fairs smoothly with the airfoil upper surface and its under surface forms a portion of the front boundary wall of the slot, said lip in the normal position serving to close the outlet of the slot and variable ratio mechanism positively connected for movement in either direction to said slot lip and operable when actuated in one direction from a neutral position to positively move said slot lip a limited amount such that its trailing edge opens the discharge opening of the slot to effect lift control without disrupting the airflow over the upper surface of the airfoil and actuation of said variable ratio mechanism in the opposite direction from said neutral position causing said slot lip to be rotated such that its trailing edge is elevated to a limit position at least three times the magnitude of its limit position attained through actuation of said variable ratio mechanism in said one direction.

4. In a lift and roll control device of the character described an airfoil having spaced spanwise extending wall members defining a lift control slot therethrough, the forward wall having a pivotally supported portion in a normal position overlying and contacting the terminal portion of the rear wall to close the slot outlet and means positively connected to said movable wall portion for movement in either direction and operable in one sense from a neutral position to positively elevate said wall portion to permit a controlled airflow through said slot and operable from said neutral position in the opposite sense to cause said movable wall to be projected above the upper boundary of the airfoil so as to serve as a spoiler to disrupt the airflow thereover and to cause a decrease in the lift of the airfoil.

5. A lift control device for aircraft comprising in combination with a wing of airfoil cross section, a fixed slot extending spanwise and upward and rearward through the wing, the slot having an inlet on the undersurface of the wing and having an outlet at the upper surface of the wing aft of the midpoint of the airfoil chord, airflow through said slot controlling lift and boundary layer conditions on the rear portion of the airfoil, a movable lip pivoted on said wing so as to smoothly fair with the upper surface of the airfoil and to close the slot outlet, lift varying means positioned adjacent the trailing edge of the wing and movable from a neutral position in one sense to increase the airfoil lift and movable in an opposite sense from the neutral position to decrease the airfoil lift and increase the drag, control means movable in opposite directions from a neutral position operatively connected to said lift varying means to actuate the same and means positively connected for movement in either direction to said control means and to said lip and operative when said control means is actuated in the sense to actuate the lift varying means to increase airfoil lift to positively rotate said lip to open the slot outlet to effect air flow through said slot without disturbing the air flow over the airfoil and to rotate said lip in the same sense but an amount that air flow over the airfoil is disrupted upon a predetermined displacement of said control means from the neutral position in the opposite sense.

6. Structure as claimed in claim 5, in which the lift varying means is an auxiliary airfoil nested into the undersurface of the wing adjacent the trailing edge when in a neutral position, the auxiliary airfoil being supported by a pair of links from the wing structure, said airfoil being connected to said lift varying control means so as to be displaced in one direction from the neutral position so that its trailing edge moves down and to the rear of the trailing portion of the airfoil with a simultaneous increase in the angle of incidence of the auxiliary airfoil whereby to increase the lift of the wing and when displaced in the opposite sense from the neutral position said auxiliary airfoil having its leading edge moved forward and down to give a negative angle of incidence with respect to the airfoil and to thereby cause a reduction in the lift of the wing and an increase in drag.

7. In an aircraft having a wing of airfoil cross section with a slot extending from the lower to the upper surface thereof, the outlet of the slot being between fifty and seventy percent of the chord of the airfoil aft of the leading edge, a spoiler plate pivotally mounted at its leading edge on the upper surface of the airfoil and when in a normal retracted position overlying and closing the outlet of said slot, control means movable in opposite senses from a neutral position positively connected to said spoiler plate and for movement in one sense from said neutral position for positively elevating said plate to control the slot discharge opening without spoiling airflow over the rear portion of the airfoil and for movement of said control means in the opopsite sense from the neutral position causing elevation of the spoiler plate in an amount sufficient to spoil or disrupt airflow over the upper surface of the airfoil, the limit position of the spoiler plate in the second named movement of said control means being at least three times the limit position of said spoiler plate when said control means is moved in said first-named sense.

8. The structure as claimed in claim 7, including a supplemental flap supported on said wing and independent of said slot, said flap being movable selectively to a first limit position where it serves to increase the lift coefficient of the wing in addition to the increase derived from airflow through said slot and to a second limit position where it serves as an aerodynamic brake and means positively connecting said flap and said control means whereby said flap is moved to its first and second limit positions respectively in synchronism with movement of said spoiler plate to its corresponding limit positions.

References Cited in the file of this patent

UNITED STATES PATENTS

| | | |
|---|---|---|
| 2,170,787 | Rose | Aug. 22, 1939 |
| 2,282,647 | Dillon | May 12, 1942 |
| 2,407,401 | Clauser et al. | Sept. 10, 1946 |